United States Patent
Chen et al.

(10) Patent No.: US 12,400,429 B2
(45) Date of Patent: Aug. 26, 2025

(54) METHOD AND ELECTRICAL DEVICE FOR TRAINING CROSS-DOMAIN CLASSIFIER

(71) Applicant: NATIONAL SUN YAT-SEN UNIVERSITY, Kaohsiung (TW)

(72) Inventors: Yen-Ming Chen, Kaohsiung (TW); Hao-Liang Wen, Kaohsiung (TW); Yu-Xiang Chen, Kaohsiung (TW); Kuo-Chun Lin, Kaohsiung (TW)

(73) Assignee: NATIONAL SUN YAT-SEN UNIVERSITY, Kaohsiung (TW)

( * ) Notice: Subject to any disclaimer, the term of this patent is extended or adjusted under 35 U.S.C. 154(b) by 340 days.

(21) Appl. No.: 18/332,764

(22) Filed: Jun. 12, 2023

(65) Prior Publication Data
US 2024/0290072 A1  Aug. 29, 2024

(30) Foreign Application Priority Data
Feb. 24, 2023 (TW) ................. 112106835

(51) Int. Cl.
*G06V 10/764* (2022.01)
*G06V 10/82* (2022.01)
*G06V 40/18* (2022.01)

(52) U.S. Cl.
CPC ............ *G06V 10/764* (2022.01); *G06V 10/82* (2022.01); *G06V 40/197* (2022.01)

(58) Field of Classification Search
CPC ..... G06V 10/764; G06V 40/197; G06V 10/82
See application file for complete search history.

(56) References Cited

U.S. PATENT DOCUMENTS

| | | |
|---|---|---|
| 11,275,819 B2 | 3/2022 | Kursun |
| 2021/0192335 A1 | 6/2021 | Das et al. |
| 2022/0414430 A1 | 12/2022 | Li et al. |

FOREIGN PATENT DOCUMENTS

| | | |
|---|---|---|
| CN | 111241291 A | 6/2020 |
| CN | 111597977 A | 8/2020 |

(Continued)

OTHER PUBLICATIONS

Shunping Ji et al, "Generative Adversarial Network-Based Full-Space Domain Adaptation for Land Cover Classification From Multiple-Source Remote Sensing Images", 2021, IEEE Transactions on Geoscience and Remote Sensing, vol. 59, No. 5, pp. 3816-3828 (Year: 2021).*

(Continued)

*Primary Examiner* — David F Dunphy
(74) *Attorney, Agent, or Firm* — CKC & Partners Co., LLC

(57) ABSTRACT

A method for training a cross-domain classifier includes the following steps: (a) obtaining training samples from a first database and test samples from a second database; (b) performing an inference procedure to the test samples by the classifier to generate corresponding predicted labels; (c) for a certain category, obtaining the training samples and the test samples belonging to this category, and training an generative adversarial network (GAN) according to the obtained training samples and test samples; (d) performing a style conversion to the obtained training samples by the GAN to obtain synthetic samples; (e) merging the synthetic samples with the training samples to train the classifier; and repeating the above steps (b) to (e). The classifier will be suitable for cross-domain databases based on this iterative procedure.

15 Claims, 6 Drawing Sheets

(56) References Cited

FOREIGN PATENT DOCUMENTS

| | | |
|---|---|---|
| CN | 113255551 A | 8/2021 |
| CN | 114818947 A | 7/2022 |
| CN | 115690534 A | 2/2023 |
| TW | I748596 B | 12/2021 |
| TW | 202203152 A | 1/2022 |
| TW | 202211167 A | 3/2022 |

OTHER PUBLICATIONS

Aidan Boyd et al., "Iris presentation attack detection: Where are we now?" Pattern Recognition Letters, Aug. 22, 2020, pp. 483-489, vol. 138.

Taesung Park et al., "Contrastive Learning for Unpaired Image-to-Image Translation," European Conference on Computer Vision (ECCV), Aug. 20, 2020, pp. 1-29, v3.

Yachun Li et al., "Few-shot one-class domain adaptation based on frequency for iris presentation attack detection," IEEE International Conference on Acoustics, Speech and Signal Processing (ICASSP), Apr. 1, 2022, v1.

\* cited by examiner

METHOD AND ELECTRICAL DEVICE FOR TRAINING CROSS-DOMAIN CLASSIFIER

RELATED APPLICATIONS

This application claims priority to Taiwan Application Serial Number 112106835 filed Feb. 24, 2023, which is herein incorporated by reference.

BACKGROUND

Field of Invention

This disclosure is related to a method and an electrical device for training a classifier capable of handling samples from multiple databases (i.e. cross-domain).

Description of Related Art

Machine learning algorithms can be used to train a classifier, for example, to categorize an image into two categories: containing people and not containing people. Training a classifier requires a large number of training samples, but typically these samples come from the same database. Training samples from the same database share several common attributes, such as being captured by the same device, having similar color tones, and similar backgrounds. However, in various applications or competitions, test samples and training samples may belong to different databases. In other words, test samples may have vastly different attributes from training samples, which usually results in a decrease in classification accuracy. How to address this issue is a concern for technical personnel in this field.

SUMMARY

Embodiments of the disclosure provide a method performed by an electrical device. The method includes the following steps: (a) obtaining multiple training samples from a first database, and obtaining multiple test samples from a second database, in which each of the training samples has a ground-truth label belonging to one of multiple categories; (b) performing, by a classifier, an inference procedure on the test samples to obtain multiple predicted labels, in which each of the predicted labels belongs to one of the categories; (c) for a first category, obtaining the training samples having the ground-truth labels belonging to the first category and obtaining the test samples having the predicted labels belonging to the first category, and training a generative adversarial network according to the obtained training samples and the obtained test samples; (d) performing, by the generative adversarial network, a style conversion on the obtained training samples to obtain multiple synthetic samples; (e) merging the synthetic samples with the training samples to train the classifier; and repeating the step (b) to the step (e).

In some embodiments, each of the predicted labels has a confidence level. The step (c) includes: obtaining the test samples corresponding to the predicted labels belonging to the first category and having the confidence levels greater than a threshold; and increasing the threshold as training epochs progress.

In some embodiments, before the step (b), the method further includes: pre-training the classifier according to the training samples; and pre-training the generative adversarial network according to the training samples and the test samples.

In some embodiments, the training samples and the test samples are eye images, and the categories include a true-category and a false-category.

In some embodiments, the step (c) includes: training another generative adversarial network for another one of the categories.

From another aspect, embodiments of the present disclosure provide an electrical device including a memory storing multiple instructions and a processor communicatively connected to the memory. The processor is configured to execute the instructions to perform the method.

BRIEF DESCRIPTION OF THE DRAWINGS

The invention can be more fully understood by reading the following detailed description of the embodiment, with reference made to the accompanying drawings as follows.

DETAILED DESCRIPTION

Specific embodiments of the present invention are further described in detail below with reference to the accompanying drawings, however, the embodiments described are not intended to limit the present invention and it is not intended for the description of operation to limit the order of implementation. Moreover, any device with equivalent functions that is produced from a structure formed by a recombination of elements shall fall within the scope of the present invention. Additionally, the drawings are only illustrative and are not drawn to actual size.

The using of "first", "second", "third", etc. in the specification should be understood for identifying units or data described by the same terminology, but are not referred to particular order or sequence.

Figure 1:
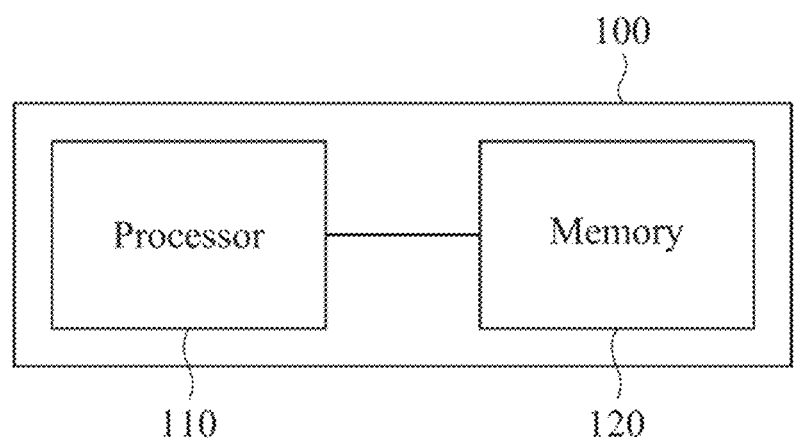
FIG. 1 is a diagram of an electrical device according to an embodiment.

FIG. 1 is a diagram of an electrical device according to an embodiment. Referring to FIG. 1, an electric device 100 may be a smart phone, a tablet, a personal computer, a notebook computer, a server, a distributed computer, a cloud server, an industrial computer, or any electric device having computing ability, which is not limited in the disclosure. The electrical device 100 includes a processor 110 and a memory 120. The processor 110 is communicatively connected to the memory 120 through any wired or wireless communication means, or through the Internet. The processor 110 can be a central processor, microprocessor, microcontroller, image processing chip, special application integrated circuit, etc. The memory 120 can be a random access memory, read-only memory, flash memory, floppy disk, hard disk, optical disk, USB drive, tape, or a database that can be accessed through the Internet. The memory 120 stores multiple instructions which are executed by the processor 110 to perform a method for training a cross-domain classifier.

In general, one classifier and multiple generative adversarial networks (GANs) are trained in the disclosure. The GANs are used to perform style conversion on training samples to increase the amount of training data, while the classifier is used to provide labels for test samples. The classified test samples are then used to train the GANs. This means that the classifier and GANs are iteratively trained. The following will provide a detailed explanation of this method.

Figure 2:
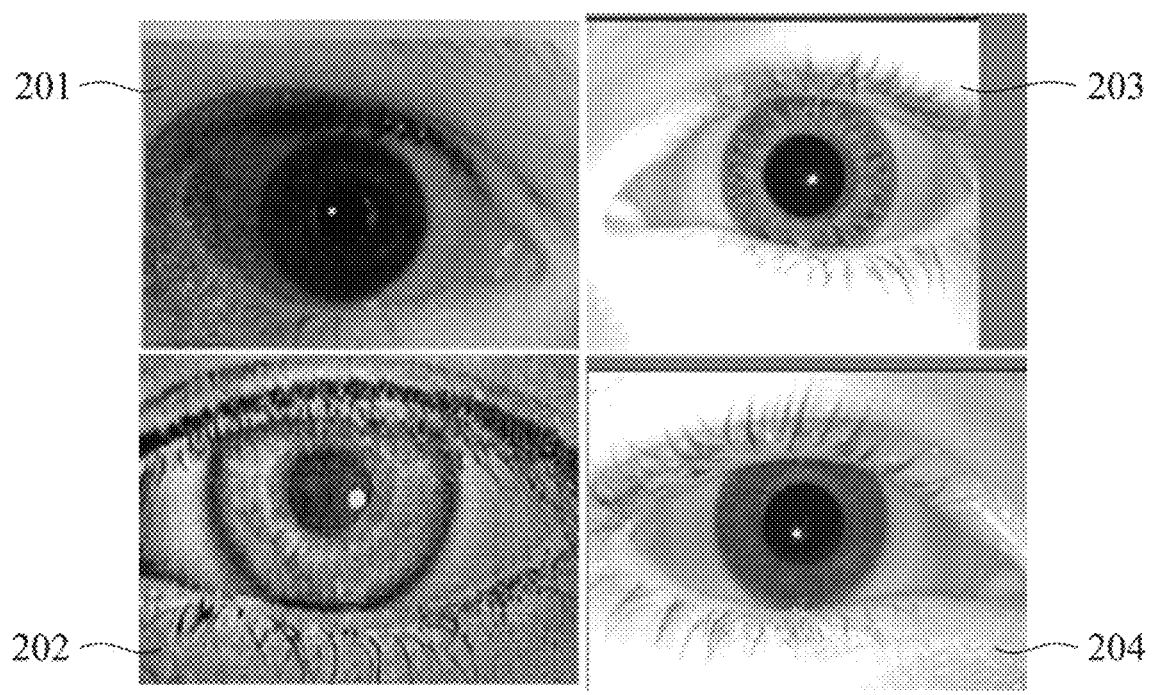
FIG. 2 is a schematic diagram of the samples processed in some embodiments.
Figure 2:
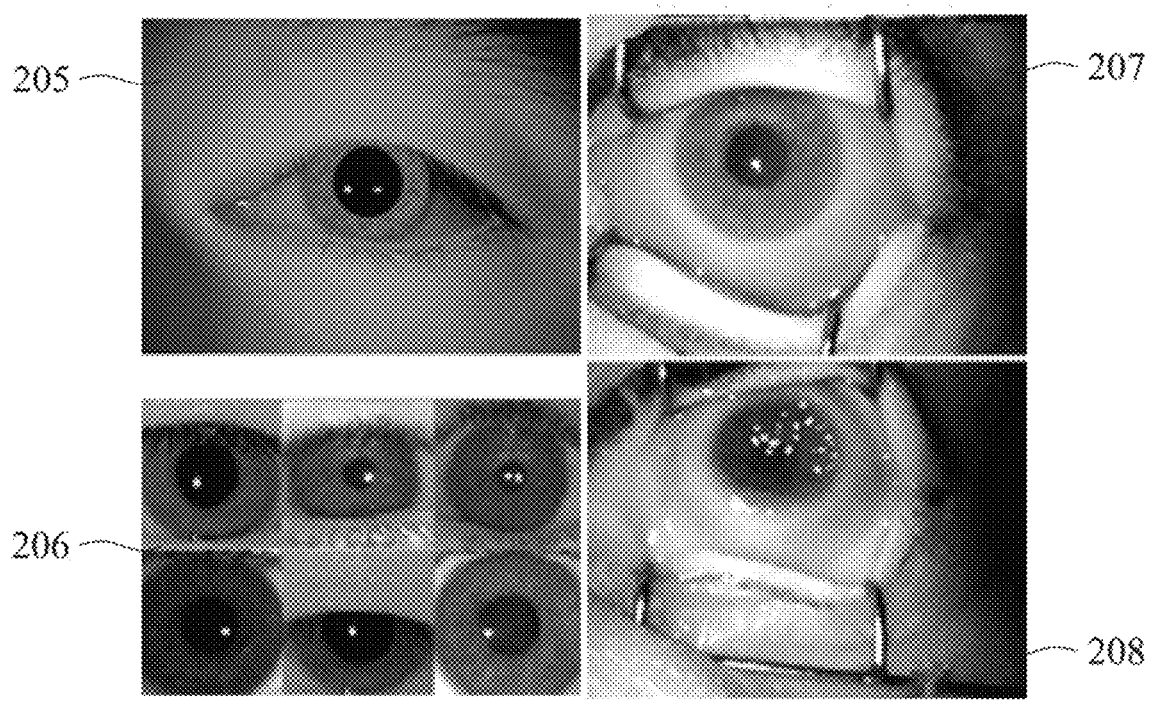

FIG. 2 is a schematic diagram of the samples processed in some embodiments. Referring to FIG. 2, in some embodiments, the processed samples are images that include a human eye and can be used for iris recognition. The iris is unique, stable, non-invasive, and suitable for biometric identification technology. As iris recognition systems become increasingly popular and do not require manual supervision, the security of resisting attacks becomes crucial. The most common security vulnerability is a presentation attack. The definition of the presentation attack is "a presentation of biometric data captured by a subsystem aimed at interfering with the operation of a biometric system." In other words, the attacker presents an attack sample to the iris sensor to manipulate the system to make incorrect decisions. The attacker may have obtained personal iris images that can access the system and hope to grant access by presenting the attack sample. For example, an image 201 is a real and authorized human eye image, while an image 202 is an attack sample generated by printing on paper or displaying on a screen. An image 203 is a real and authorized image, while an image 204 is generated using textured contact lenses. An image 205 is a real and authorized image, while an image 206 is a synthesized image generated by artificial intelligence technology. An image 207 is a real and authorized image, while an image 208 is an image of a dead person. Within a few hours after death, the texture of the iris remains intact and can deceive the system.

The classifier trained here is used to recognize whether an image is real or fake (i.e., an attack sample). However, the techniques disclosed below can also be applied to other categories, such as identifying objects in images as humans, cats, dogs, cars, etc. Additionally, the techniques disclosed below can be applied to various types of data, such as sound signals, text, electrocardiograms, medical images, and so on.

Figure 3:
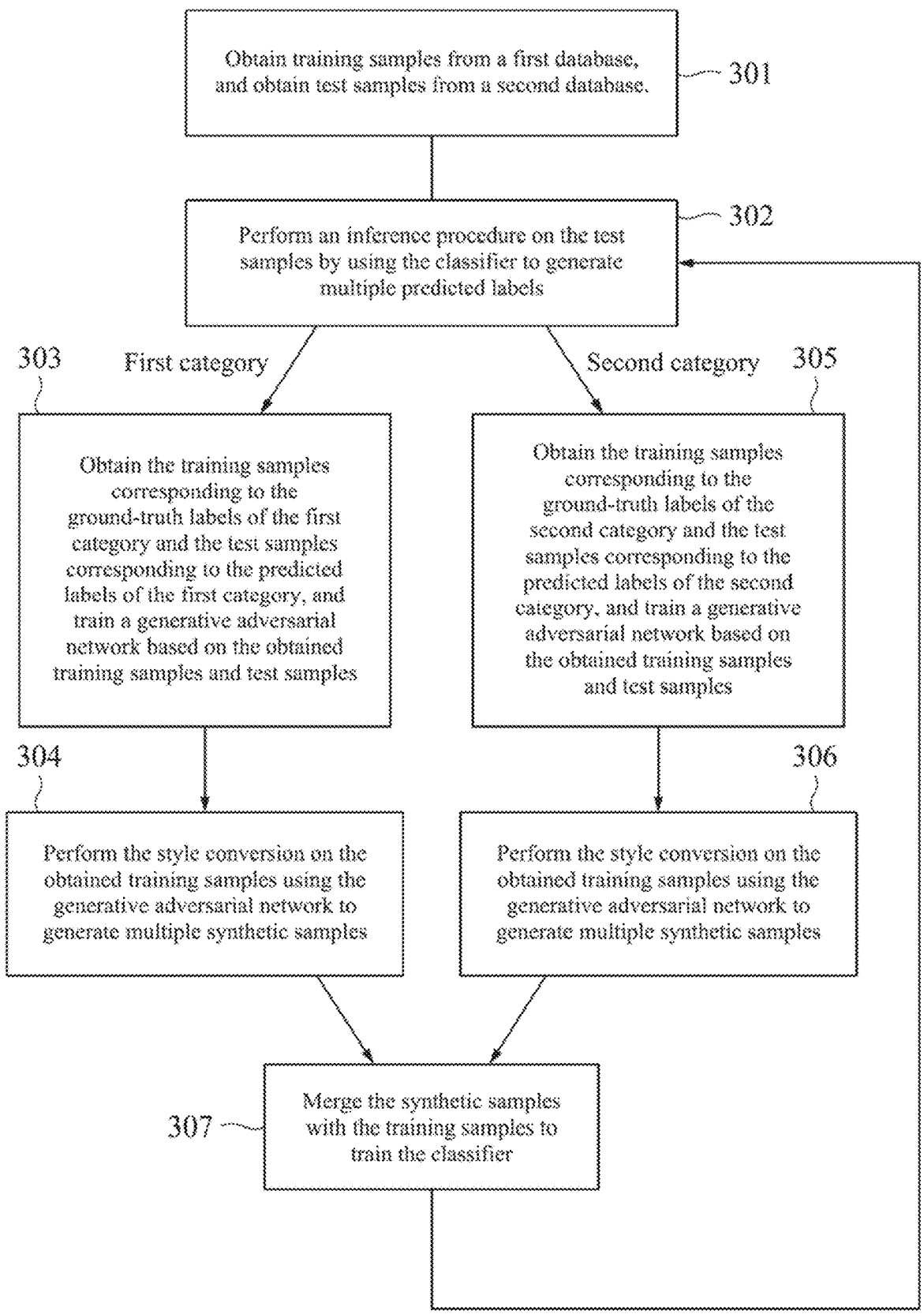
FIG. 3 is a flowchart of a cross-domain training method according to an embodiment.
Figure 4:
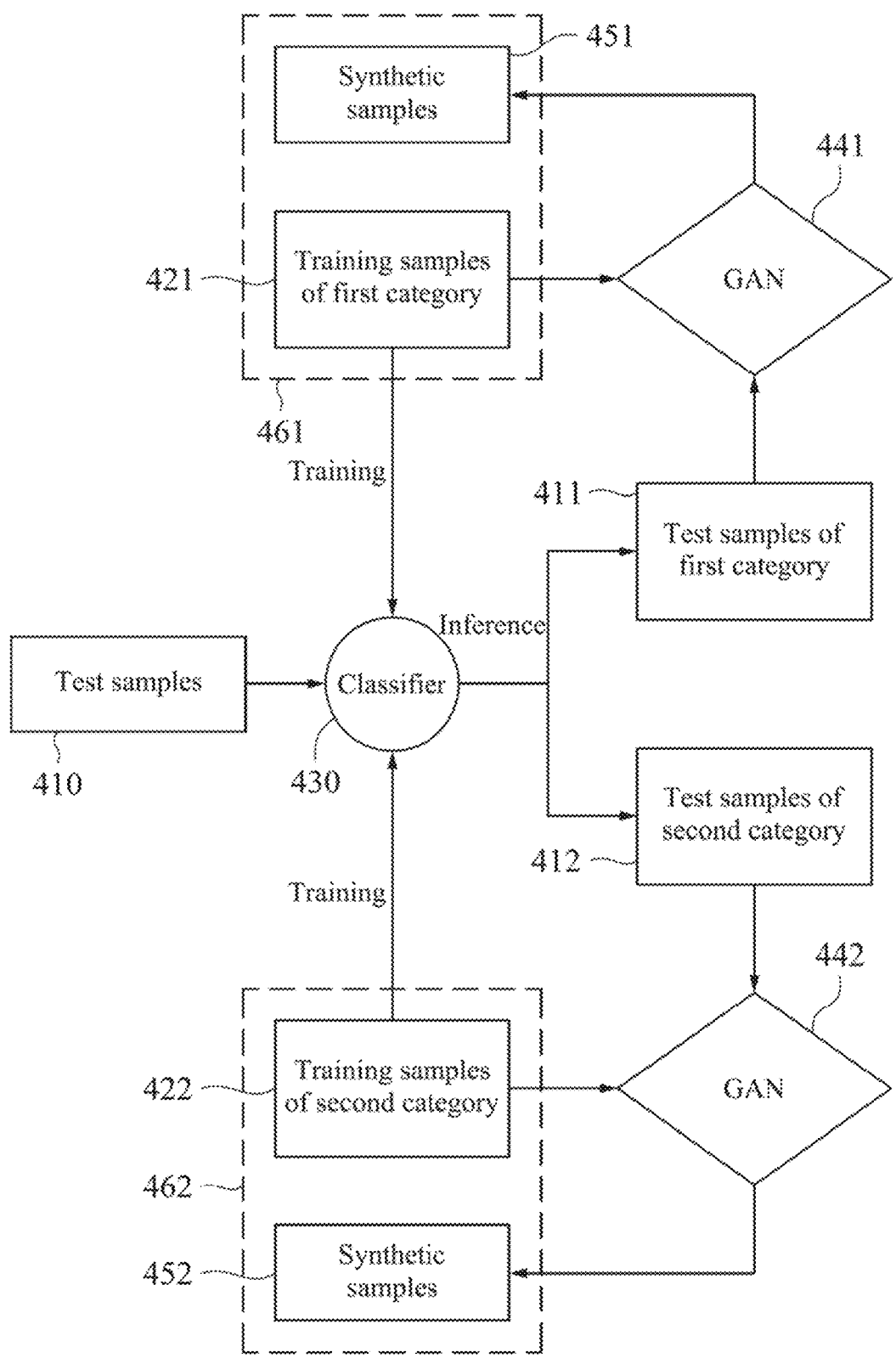
FIG. 4 is a schematic diagram of sample allocation during training according to an embodiment.

FIG. 3 is a flowchart of a cross-domain training method according to an embodiment. FIG. 4 is a schematic diagram of sample allocation during training according to an embodiment. Referring to FIGS. 3 and 4, in step 301, training samples are obtained from a first database, and test samples are obtained from a second database. These training and test samples can be, for example, eye images. The first and second databases can be provided by different institutions, captured by different devices, obtained at different locations, or one of the databases may be publicly available before a competition while the other is the database to be tested during the competition that is not limited in the disclosure. Each training sample has a ground-truth label that belongs to one of multiple categories. In this embodiment, a first category is referred to as "True" and a second category is referred to as "False." In FIG. 3, the training samples mentioned above are divided into the training samples 421 of the first category and the training samples 422 of the second category. The test samples 410 do not have ground-truth labels.

Next, in step 302, an inference procedure is performed on the test samples 410 by using the classifier 430 to generate multiple predicted labels. The classifier 430 can be any machine learning algorithm, such as convolutional neural network, support vector machine, random forest, and so on that is not limited in the disclosure. In some embodiments, the architecture of the convolutional neural network is derived from LeNet, AlexNet, VGG, GoogLeNet, ResNet, DenseNet, EfficientNet, or YOLO (You Only Look Once), etc. In this embodiment, each predicted label belongs to the first category or second category, and depending on the predicted category, the test samples 410 are divided into test samples 411 of the first category and test samples 412 of the second category.

Each category has a branch. For example, the first category corresponds to steps 303 and 304, while the second category corresponds to steps 305 and 306. The first category is explained first. In the step 303, the training samples 421 corresponding to the ground-truth labels of the first category and the test samples 411 corresponding to the predicted labels of the first category are obtained. A generative adversarial network 441 is trained based on the training samples 421 and the test samples 411. In this embodiment, the generative adversarial network 441 is based on the network architecture proposed in the paper "Contrastive learning for unpaired image-to-image translation" by Park, Taesung, et al., presented at the European Conference on Computer Vision in 2020. In other implementations, the generative adversarial network 441 can be a cycle-consistent adversarial network (cycleGAN) or any suitable generative adversarial network. The generative adversarial network is used to transform one probability distribution into another, and it has already been widely applied, for example, to change the orientation, expression, features, and skin color of a face. In this approach, the training samples are taken as the source domain for the generative adversarial network, while the test samples are taken as the target domain. This generative adversarial network is used to transform the style of the samples from one database to another database, referred to as style conversion.

Figure 6:
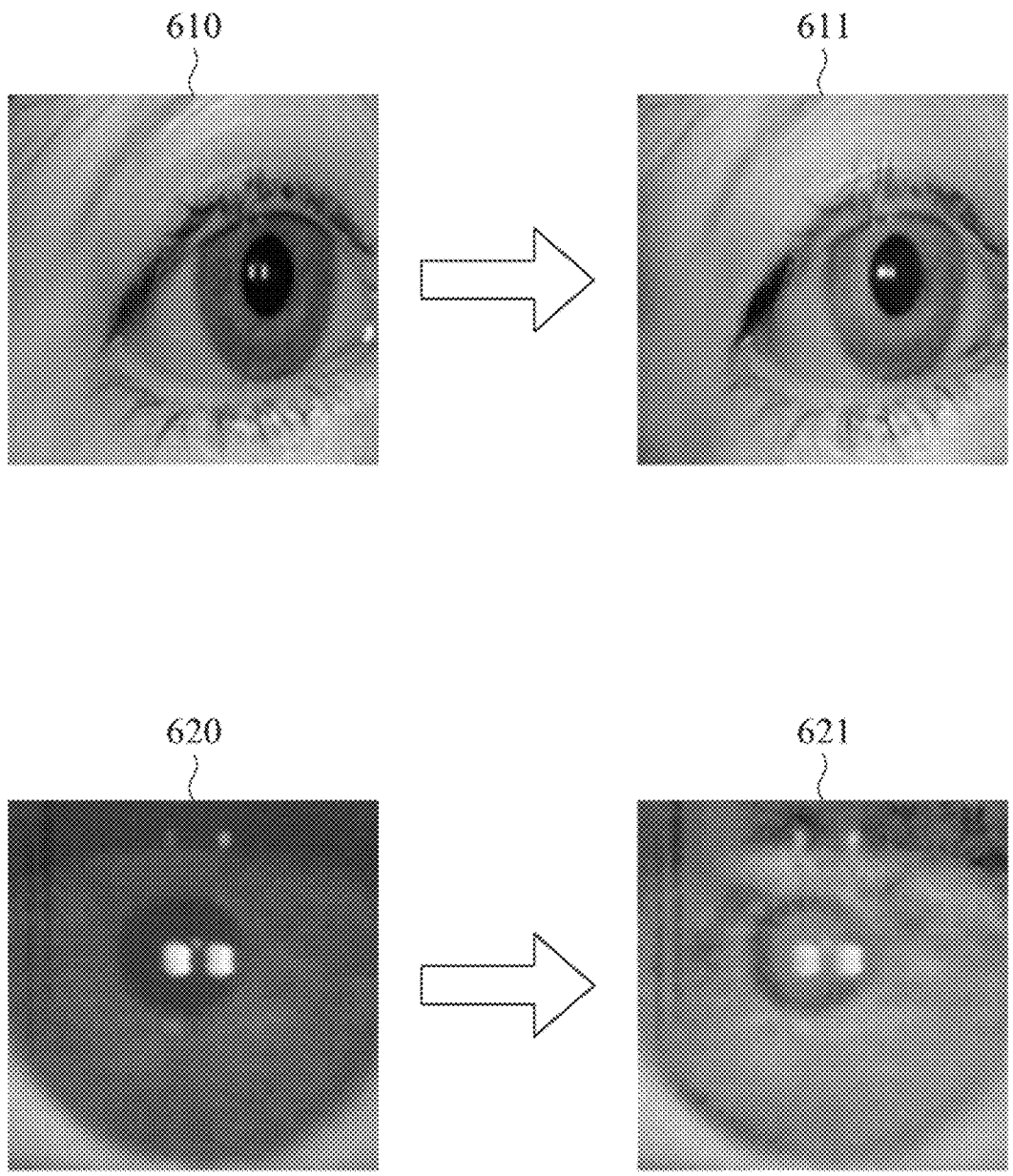
FIG. 6 is a diagram of samples of style conversion according to an embodiment.

In step 304, multiple synthetic samples 451 are obtained by performing the style conversion on the acquired training samples 421 using the generative adversarial network 441. In other words, the synthetic samples 451 have the content of the training samples but with the style of the test samples, and their labels are the same as the ground-truth labels of the corresponding training samples 421. Referring to FIG. 6 for an example of style conversion. An image 610 belongs to the true-category of the first database and is converted to an image 611 in the style of the second database.

Similar processing is carried out in steps 305 and 306. In step 305, training samples 422 and test samples 412 corresponding to the ground-truth labels and the predicted labels of the second category, respectively, are obtained and used to train a generative adversarial network 442. The generative adversarial network 442 can have the same architecture as the generative adversarial network 441, but is trained by different data. In other words, different generative adversarial networks 441 and 442 are trained for different categories. In step 306, the style conversion is performed on the training samples 422 using the generative adversarial network 442 to generate multiple synthetic samples 452. The labels of the synthetic samples 452 are the same as the corresponding training samples 422. An example of style conversion can be found in FIG. 6, where an image 620 belongs to the false-category of the first database, and after being converted to the style of the second database, an image 621 is obtained.

In step 307, the synthetic samples are merged with the training samples to train the classifier. Specifically, the synthetic samples 451 and the training samples 421 both have the label of "true", so they are merged together as positive samples 461. In addition, the synthetic samples 452 and the training samples 422 both have the label of "false", so they are merged together as negative samples 462. The classifier 430 is trained based on the positive samples 461 and the negative samples 462.

The training process is performed iteratively by repeating the steps 302-307 until convergence is achieved. In summary, the test samples 410 are fed into the classifier 430 for classification, and a temporary predicted label is assigned based on the classification result. Then, the generative adversarial networks are trained based on the same category of training samples and test samples. The training samples are then converted into the style of the test samples to increase the amount of data in the training set. As the classification ability of the classifier 430 becomes more accurate, the generative adversarial networks are able to increase the size of the training set more effectively. This leads to a more accurate classifier 430, which can successfully determine the category of the test samples.

The architecture in FIG. 4 may encounter some issues in the initial stages of training. Firstly, the classification accuracy of the classifier 430 may be poor, and misclassified test samples will be input into the generative adversarial network, causing the two inputs of the generative adversarial network belong to different categories which indicates a mismatch between the resource and target domains. As a result, the synthetic samples produced by the style conversion may not effectively assist in the training classifier 430. The second issue is that the generative adversarial networks 441 and 442 may not have completed their training, resulting in low-quality generated images that are not helpful for training the classifier 430. To address these issues, a warm-up mechanism is added before the iteration process (i.e. steps 302-307 in FIG. 3) in some embodiments.

Figure 5:
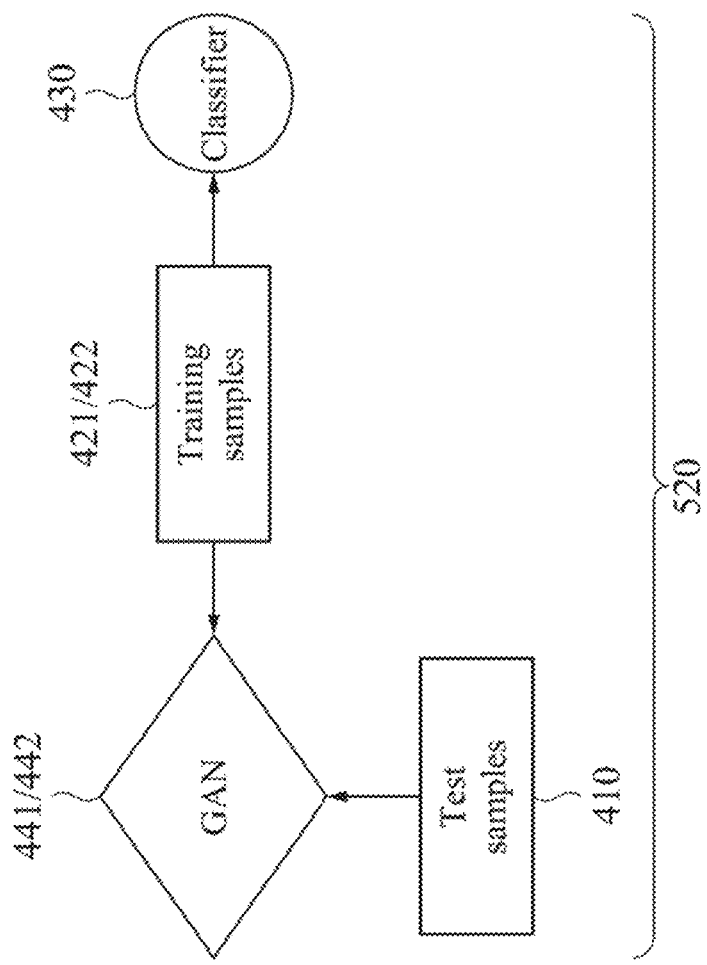
FIG. 5 is a schematic diagram of the warm-up mechanism according to an embodiment.
Figure 5:
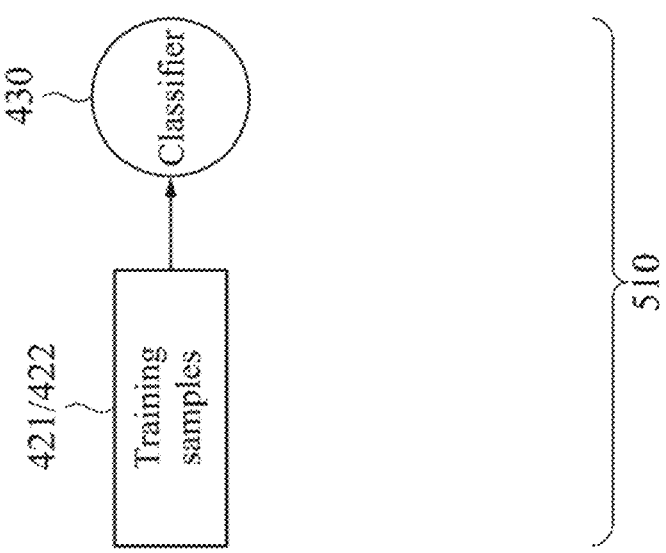

FIG. 5 is a schematic diagram of the warm-up mechanism according to an embodiment. The warm-up mechanism includes two stages of training epochs 510 and 520. In the training epochs 510, the classifier 430 is pre-trained based on the training samples 421 and 422. Then, in the training epochs 520, the training samples 421 and 422 are taken as the resource domain, and the test samples 410 are taken as the target domain to pre-train the generative adversarial networks 441 and 442. The classifier 430 is also trained based on the training samples 421 and 422 in the training epochs 520. During pre-training, the classification results of the classifier 430 are not input to the generative adversarial networks 441 and 442, and the output of the generative adversarial networks 441 and 442 are not merged into the training data to train the classifier 430. That is, the classifier 430 and the generative adversarial networks 441 and 442 are pre-trained separately. In some embodiments, the length of the training epochs 510 is equal to 20 (i.e. 20 epochs), and the length of the training epochs 520 is equal to 20, but this disclosure is not limited to this.

Referring to FIG. 3 and FIG. 4, when the classifier 430 performs the inference procedure, a confidence level (or referred to as a probability of belonging to the predicted category) is generated for each predicted label. In the steps 303 and 305, only the test samples corresponding to the predicted labels with a confidence level greater than a threshold are selected. For example, if the threshold is 0.6, a test sample that is classified as the first category but has a confidence level below 0.6 would not be selected as an input to the generative adversarial network 441. This threshold setting is to ensure the quality of the generated images and to reduce the number of misclassified test samples input into the generative adversarial networks 441 and 442. In some embodiments, the threshold is increased as the training epochs progress. For example, the threshold can be set to 0.7 for the first 20 training epochs and then to 0.8 for the next 20 training epochs, and so on. As the training progresses, the accuracy of the classifier 430 will gradually improve, and the confidence level will also increase. Therefore, increasing the threshold gradually can help obtain more accurately classified test samples.

Another aspect of the present disclosure provides a non-transitory computer readable storage medium storing instructions which are executed by the electrical device 100 to perform the method of FIG. 3. The non-transitory computer readable storage medium may be a random access memory, read-only memory, flash memory, floppy disk, hard disk, optical disk, USB drive, tape, or a database that can be accessed through the Internet.

The main feature of the above method is the use of an iterative approach to train the classifier and the generative adversarial networks. The generative adversarial networks are used for style conversion to increase the amount of data in the training set, while the classifier provides temporary labels for test samples to train the generative adversarial networks, and both their performance is improved together. In addition, because of the style conversion, the classifier can better adapt to the style of the test dataset. In some cross-domain experiments, the average classification error rate of the above embodiments was reduced by about 9.17% compared to known methods.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A method performed by an electrical device, the method comprising a plurality of steps:
    (a) obtaining a plurality of training samples from a first database, and obtaining a plurality of test samples from a second database, wherein each of the training samples has a ground-truth label belonging to one of a plurality of categories;
    (b) performing, by a classifier, an inference procedure on the test samples to obtain a plurality of predicted labels, wherein each of the predicted labels belongs to one of the categories;
    (c) for a first category of the categories, obtaining the training samples having the ground-truth labels belonging to the first category and obtaining the test samples having the predicted labels belonging to the first category, and training a generative adversarial network according to the obtained training samples and the obtained test samples;
    (d) performing, by the generative adversarial network, a style conversion on the obtained training samples to obtain a plurality of synthetic samples;
    (e) merging the synthetic samples with the training samples to train the classifier; and
    repeating the step (b) to the step (e).

2. The method of claim 1, wherein each of the predicted labels has a confidence level, and the step (c) comprises:
obtaining the test samples corresponding to the predicted labels belonging to the first category and having the confidence levels greater than a threshold; and
increasing the threshold as training epochs progress.

3. The method of claim 1, wherein before the step (b), the method further comprises:
pre-training the classifier according to the training samples; and
pre-training the generative adversarial network according to the training samples and the test samples.

4. The method of claim 1, wherein the training samples and the test samples are eye images, and the categories comprise a true-category and a false-category.

5. The method of claim 1, wherein the step (c) comprises:
training another generative adversarial network for another one of the categories.

6. An electrical device, comprising:
a memory storing a plurality of instructions; and
a processor communicatively connected to the memory and configured to execute the instructions to perform a plurality of steps:
(a) obtaining a plurality of training samples from a first database, and obtaining a plurality of test samples from a second database, wherein each of the training samples has a ground-truth label belonging to one of a plurality of categories;
(b) performing, by a classifier, an inference procedure on the test samples to obtain a plurality of predicted labels, wherein each of the predicted labels belongs to one of the categories;
(c) for a first category of the categories, obtaining the training samples having the ground-truth labels belonging to the first category and obtaining the test samples having the predicted labels belonging to the first category, and training a generative adversarial network according to the obtained training samples and the obtained test samples;
(d) performing, by the generative adversarial network, a style conversion on the obtained training samples to obtain a plurality of synthetic samples;
(e) merging the synthetic samples with the training samples to train the classifier; and
repeating the step (b) to the step (e).

7. The electrical device of claim 6, wherein each of the predicted labels has a confidence level, and the step (c) comprises:
obtaining the test samples corresponding to the predicted labels belonging to the first category and having the confidence levels greater than a threshold; and
increasing the threshold as training epochs progress.

8. The electrical device of claim 6, wherein before the step (b), the steps further comprise:
pre-training the classifier according to the training samples; and
pre-training the generative adversarial network according to the training samples and the test samples.

9. The electrical device of claim 6, wherein the training samples and the test samples are eye images, and the categories comprise a true-category and a false-category.

10. The electrical device of claim 6, wherein the step (c) comprises:
training another generative adversarial network for another one of the categories.

11. A non-transitory computer readable storage medium storing a plurality of instructions which are configured to be executed by an electrical device to perform a plurality of steps:
(a) obtaining a plurality of training samples from a first database, and obtaining a plurality of test samples from a second database, wherein each of the training samples has a ground-truth label belonging to one of a plurality of categories;
(b) performing, by a classifier, an inference procedure on the test samples to obtain a plurality of predicted labels, wherein each of the predicted labels belongs to one of the categories;
(c) for a first category of the categories, obtaining the training samples having the ground-truth labels belonging to the first category and obtaining the test samples having the predicted labels belonging to the first category, and training a generative adversarial network according to the obtained training samples and the obtained test samples;
(d) performing, by the generative adversarial network, a style conversion on the obtained training samples to obtain a plurality of synthetic samples;
(e) merging the synthetic samples with the training samples to train the classifier; and
repeating the step (b) to the step (e).

12. The non-transitory computer readable storage medium of claim 11, wherein each of the predicted labels has a confidence level, and the step (c) comprises:
obtaining the test samples corresponding to the predicted labels belonging to the first category and having the confidence levels greater than a threshold; and
increasing the threshold as training epochs progress.

13. The non-transitory computer readable storage medium of claim 11, wherein before the step (b), the method further comprises:
pre-training the classifier according to the training samples; and
pre-training the generative adversarial network according to the training samples and the test samples.

14. The non-transitory computer readable storage medium of claim 11, wherein the training samples and the test samples are eye images, and the categories comprise a true-category and a false-category.

15. The non-transitory computer readable storage medium of claim 11, wherein the step (c) comprises:
training another generative adversarial network for another one of the categories.

\* \* \* \* \*